United States Patent [19]

Matsumoto

[11] Patent Number: 5,799,244
[45] Date of Patent: Aug. 25, 1998

[54] DIGITAL MOBILE UNIT HAVING A FUNCTION OF ISSUING A TONE LEVEL CONTROLLABLE INPUT SIGNAL DEGRADATION ALARM AND A METHOD THEREOF

[75] Inventor: Kouichi Matsumoto, Tokyo, Japan

[73] Assignee: NEC Corporation, Tokyo, Japan

[21] Appl. No.: 668,191

[22] Filed: Jun. 21, 1996

[30]  Foreign Application Priority Data

Jun. 21, 1995 [JP] Japan ................................. 7-153738

[51] Int. Cl.$^6$ ................................................ H04B 17/00
[52] U.S. Cl. ..................... 455/67.3; 455/67.7; 455/226.4
[58] Field of Search ........................ 395/185.01, 185.02;
371/30, 48, 49.1; 455/10, 38.1, 38.5, 63,
67.1, 67.3, 67.7, 575, 212–214, 218, 221,
222, 226.1, 226.4, 227, 228, 229, 200.1,
38.4, 38.2, 154.1, 156.1; 381/57, 107; 370/321

[56]  References Cited

U.S. PATENT DOCUMENTS

| | | | |
|---|---|---|---|
| 4,403,212 | 9/1983 | Masaki | 455/38.4 |
| 5,349,698 | 9/1994 | Maru | 455/200.1 |
| 5,386,209 | 1/1995 | Thomas | 455/38.2 |
| 5,615,256 | 3/1997 | Yamashita | 381/57 |

*Primary Examiner*—Reinhard J. Eisenzopf
*Assistant Examiner*—Gertrude Arthur
*Attorney, Agent, or Firm*—Sughrue, Mion, Zinn, Macpeak & Seas, PLLC

[57]  ABSTRACT

In order to adaptively control the level of an alarm which warns of imminent or impending communication interruption, an error information signal and data frame energy, which are both derived during the decoding of an incoming signal, are used. If the incoming signal is deteriorated to an extent that communication interruption is imminent, an alarm signal is issued and superimposed on a voice signal. The level of the alarm signal is controlled in accordance with the detected frame energy.

4 Claims, 2 Drawing Sheets

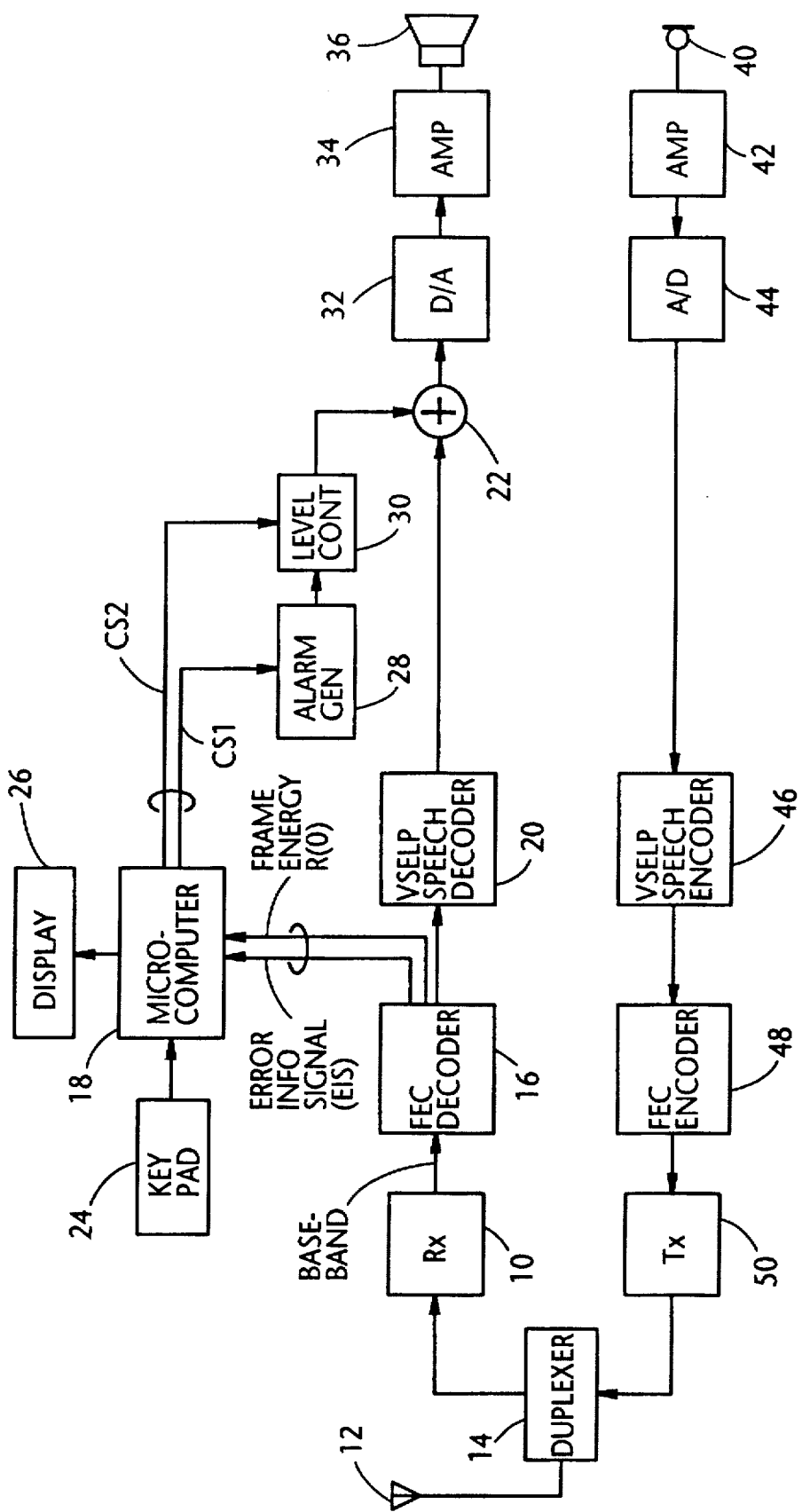

SLOT FORMAT FROM BASE STATION TO MOBILE UNIT

NOTE: SYNC : SYNCHRONIZATION AND TRAINING
SACCH : SLOW ASSOCIATED CONTROL CHANNEL
CDVCC : CODED DIGITAL VERIFICATION COLOR CODE
RSVD : RESERVED

DIGITAL MOBILE UNIT HAVING A FUNCTION OF ISSUING A TONE LEVEL CONTROLLABLE INPUT SIGNAL DEGRADATION ALARM AND A METHOD THEREOF

BACKGROUND OF THE INVENTION

1. Field of the Invention

The present invention relates generally to improvements in a digital mobile communications system, and more specifically to improved techniques for generating an alarm signal in a mobile unit when an incoming speech signal becomes deteriorated to a predetermined level. Still more specifically, the present invention relates to an arrangement and method of generating such an alarm signal whose level is controllable depending on input speech signal strength.

2. Description of the Related Art

It is known in the art to provide a mobile unit with means for generating an alarm signal if an incoming speech signal deteriorates due to noises induced during transmission. The alarm signal is added to or superimposed on a distant-end party's speech signal. Thus, a subscriber (viz., a near-end party) is advised or alerted, while talking with the distant-end party, that the communication interruption is imminent. By way of example, such a known technique is disclosed in the Japanese Laid-open Patent Application No. 3-182129 (Paper 1).

The conventional alarm generator, however, is arranged to produce an alarm signal which has a level previously fixed to a predetermined value and thus, has suffered from the following drawbacks. That is, if an incoming speech signal exhibits a high level, the alarm signal may undesirably be masked by the speech signal thereby resulting in a subscriber being unable to perceive the alarm tone. On the contrary, if an incoming speech signal is low in strength, the alarm signal in turn becomes an obstacle to being able to hear the distant-end party's voice. In the worse case, the alarm signal prevents the distance party's voice from reaching the subscriber. The above mentioned two difficulties are respectively exacerbated if the alarm level has previously been set to a lower level and a higher level.

Accordingly, what is desired is to be able to adaptively control the level of the alarm signal depending on the strength of an incoming speech signal.

SUMMARY OF THE INVENTION

It is therefore an object of the present invention to provide a digital mobile unit which is able to adaptively control an incoming signal degradation indicative alarm depending on the strength of the signal.

Another object of the present invention is to provide a method of generating an alarm which indicates an incoming signal degradation and whose level is changeable depending on the strength of the incoming signal.

These objects are fulfilled by a technique wherein in order to adaptively control the level of an alarm which warns of imminent or impending communication interruption, an error information signal and data frame energy, which are both derived during the decoding of an incoming signal, are used. If the incoming signal is deteriorated to an extent that communication interruption is imminent, an alarm signal is issued and superimposed on a voice signal. The level of the alarm signal is controlled in accordance with the detected frame energy.

More specifically, a first aspect of the present invention resides in a mobile telephone unit having an alarm signal generating function for audibly advising a subscriber of incoming speech signal deterioration, comprising: first means for deriving an error information signal and a speech energy value during decoding an incoming signal; second means for receiving the error information signal and the speech energy value, the second means checking the error information signal and issuing an alarm signal when the incoming signal is deteriorated to an extent that communication interruption is imminent, the second means controlling a level of the alarm signal in accordance with the speech energy value; and third means for superimposing the alarm signal on a speech signal derived from the incoming signal.

A second aspect of the present invention resides in a method of audibly advising a subscriber of incoming speech signal deterioration in a mobile telephone unit, comprising the steps of: deriving an error information signal and a speech energy value during decoding an incoming signal; receiving the error information signal and the speech energy value; checking the error information signal and issuing an alarm signal when the incoming signal is deteriorated to an extent that communication interruption is imminent; controlling a level of the alarm signal in accordance with the speech energy value; and superimposing the alarm signal on a speech signal derived from the incoming signal.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 1 is a block diagram showing one example of a digital mobile unit to which the present invention is applicable.

DETAILED DESCRIPTION OF THE PREFERRED EMBODIMENTS

Before turning to a preferred embodiment of the present invention, it is deemed advantageous to briefly discuss a digital cellular system to which the instant embodiment is applicable.

In view of the acute shortage of analog cellular capacity in large cities in the United States, the Telecommunication Industry Association (TIA), in association with the Electronic Industries Association (EIA), has developed a dual mode mobile-station/base-station compatibility standard (IS-54, December 1989) wherein a TDMA (time division multiple access) technique was adopted. Thereafter, April 1992, the EIA/RIA Interim Standard (IS-54-B) was released (hereinafter referred to as Paper 2). The proposed specification calls for a dual-mode mobile unit that will be allowed to access the base station whether it is an analog or a digital cellular system subscriber. Further, the aforesaid dual mode system is also discussed in a book entitled "Cellular Radio, Analog and Digital Systems" by Asha Mehrotra, published 1994 by Artech House (hereinafter referred to as Paper 3).

Merely for a better understanding of the present invention, the present embodiment is described when being applied to the above mentioned dual mode system. However, it should be noted that the present invention is in no way limited to this particular application.

Referring now to FIG. 1, there is schematically shown a mobile unit to which the present invention is applicable.

A transmitted carrier, which carries speech and control data, is applied to a receiver 10 via an antenna 12 and a duplexer 14. At the receiver 10, the transmitted carrier is filtered, down-converted to an IF (intermediate frequency) signal, and demodulated using a π/4 DQPSK (digital quadrature phase shift keying) technique whereby the transmitted data is recovered.

Figure 2A:
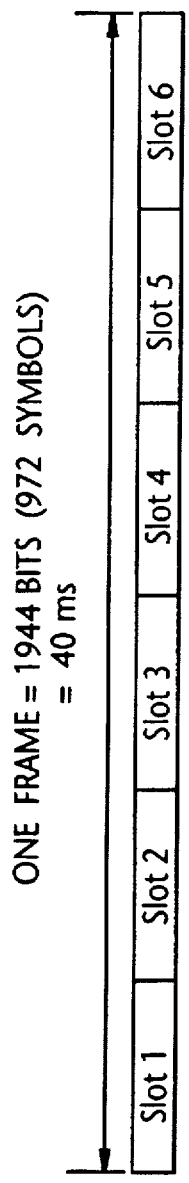
FIGS. 2A and 2B schematically show a frame format and a slot format, both of which are used in a digital mobile communications system including the mobile unit of FIG. 1.
Figure 2B:
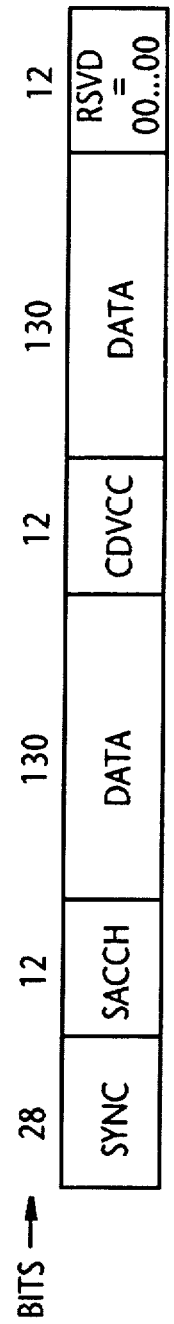

Reference is made to FIG. 2A which shows one TDXA frame format and to FIG. 2B which shows a slot format from a base station to a mobile unit at portion (B). In FIG. 2B, the other slot format from a mobile unit to a base station is omitted in that this format is irrelevant to the present invention.

As shown in FIG. 2A, each TDMA frame consists of six equal duration time slots 1–6, having 162 (=972/6) symbols (or 324 (=1944/4) bits). Each full-rate traffic channel utilizes two equally spaced time slots of the frame (slots 1 and 4, slots 2 and 5, or slots 3 and 6).

In FIG. 2B, each time slot contains 12 bits of signaling message and this field is designated as SACCH (slow associated control channel). On the other hand, a CDVCC (coded digital verification color code) provides the same function as a SAT (Supervisory audio tones) in an analog cellular system. The function of the SAT is similar to the closing of a local loop in a conventional (viz., land) telephone system.

Returning to FIG. 1, an FEC (frame error correction) decoder 16 is supplied with the baseband signal from the receiver 10. The FEC decoder 16 implements error correction on the inputted baseband signal using known techniques such as CRC (cyclic redundancy checks), convolutional decoding, etc. If the FEC decoder 16 is unable to correct the errors, the decoder 16 generates an error information signal (depicted by EIS). The error information signal EIS, which includes frame data correct/incorrect information and an estimated number of error bits within each frame, is applied to a microcomputer 18.

As discussed in detail in Papers 2 and 3 which are hereby incorporated by reference thereto, a frame energy value (depicted by R(0) or R0) is computed and encoded once per frame at a base station. This frame energy value R(0) reflects the average signal power in the input speech over 20 ms. How to compute the frame energy value R(0) at the base station is known and described in detail in Paper 2 (pages 33–34). Hence, further descriptions thereof is omitted for simplifying the instant disclosure. The frame energy value R(0) is encoded into five (5) bits, incorporated into the data field DATA in each slot (see FIG. 2B), and transmitted to the mobile unit of FIG. 1. The PEC decoder 16 extracts the frame energy code R(0) and applies same to the microcomputer 18.

The FEC decoder 16, after carrying out error correction on the speech data, applies same to a VSELP (vector sum-excited linear predictive) speech decoder 20. The speech data supplied to the decoder 20 includes various parameter codes including the aforesaid frame energy code R(0). Subsequently, the output of the VSELP speech decoder 20 is applied to an adder (or superimposer) 22.

As shown in FIG. 1, the microcomputer 18 is coupled to a key pad 24 and a suitable display 26 such as an LCD (liquid crystal display). As is well known, the key pad 24 functions as an interface between a subscriber and the mobile unit of FIG. 1.

As referred to above, the microcomputer 18 receives the error information signal EIS and the frame energy code R(0) both from the FEC decoder 16. Further, as mentioned above, the signal BIS includes the frame data correct/incorrect information and the estimated number of error data bits in each frame. The microcomputer 18 computes an error bit rate using the estimated number of error bits. Subsequently, the microcomputer 18 ascertain, based on the calculated error bit rate and the frame data correct/incorrect information, a situation wherein the communication interruption is imminent.

In the above discussion, the frame data correct/incorrect information can be omitted from considering the imminent communication interruption. It is known in the art that if the bit error rate exceeds about 3%, it is highly probable for the communication interruption to occur. However, in view of a mobile unit being used in a variety of different environments, the threshold for use in determining issuance of the alarm may be settled through various field tests.

In any way, if the communication interruption is threatening, the microcomputer 18 issues two control signals CS1 and C92.

The control signal CS1 indicates that the subscriber should be notified of the possibility of communication blockage, while the other control signal CS2 indicates a tone alarm level which depends on the above mentioned speech data frame energy.

An alarm generator 28 responds to the control signal SC1 and generates an alarm signal having a predetermined level. On the other hand, a level controller 30 adjusts the alarm level in response to the control signal SC2. The alarm signal issued from the alarm generator 28 is adaptively (viz., suitably) controlled in terms of the signal level depending on the frame energy. The level controller 30 is well known in the art and incorporated in a digital signal processor (DSP) and thus the detailed description thereof is deemed unnecessary.

The alarm signal thus level adjusted is added to or superimposed on the speech data from the decoder 20 at the adder 22. The output of the adder 22 is converted into the corresponding analog signal at an D/A (digital-to-analog) converter and passes through an amplifier 32 to a speaker 36.

A transmit section of the mobile unit of FIG. 1 includes a microphone 40, an audio amplifier 42, an A/D (analog-to-digital) converter 44, a speech encoder 46, an FEC encoder 48, and a transmitter 50, all of which are arranged as shown. Since the present invention is irrelevant to the transmit section, further description thereof is redundant and accordingly omitted for simplifying the disclosure.

It will be understood that the above disclosure is representative of only one possible embodiment of the present invention and that the concept on which the invention is based is not specifically limited thereto.

What is claimed is:

1. A mobile telephone unit having an alarm signal generating function for audibly advising a subscriber of incoming speech signal deterioration, comprising:

first means for deriving an error information signal and a speech energy value during decoding an incoming signal;

second means for receiving said error information signal and said speech energy value, said second means checking said error information signal and issuing an alarm signal when said incoming signal is deteriorated to an extent that communication interruption is imminent, said second means controlling a level of said alarm signal in accordance with said speech energy value; and third means for superimposing said alarm signal on a speech signal derived from said incoming signal.

2. A mobile telephone unit as claimed in claim 1, further including a speaker operatively coupled to said third means for producing said speech signal including said alarm signal.

3. A mobile telephone unit as claimed in claim 1, wherein said mobile telephone unit is employed in a TDMA digital communication system, and said speech energy value reflecting an average signal power in a distant-end party's speech over a predetermined time period.

4. A method of audibly advising a subscriber of incoming speech signal deterioration in a mobile telephone unit, comprising the steps of;

deriving an error information signal and a speech energy value during decoding an incoming signal;

receiving said error information signal and said speech energy value;

checking said error information signal and issuing an alarm signal when said incoming signal is deteriorated to an extent that communication interruption is imminent;

controling a level of said alarm signal in accordance with said speech energy value; and superimposing said alarm signal on a speech signal derived from said incoming signal.

\* \* \* \* \*